(12) United States Patent
Ji et al.

(10) Patent No.: US 12,580,641 B2
(45) Date of Patent: Mar. 17, 2026

(54) CONFIGURATION FOR INTER-SATELLITE LINK

(71) Applicant: QUALCOMM Incorporated, San Diego, CA (US)

(72) Inventors: Lianghai Ji, San Diego, CA (US); Jun Ma, San Diego, CA (US); Qiang Wu, San Diego, CA (US); Liangping Ma, San Diego, CA (US); Huilin Xu, Temecula, CA (US); Mohamad Sayed Hassan, Paris (FR); Mehmet Izzet Gurelli, San Diego, CA (US); Weimin Duan, San Diego, CA (US); Karthik Anantha Swamy, La Jolla, CA (US); Onur Senel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 17/812,349

(22) Filed: Jul. 13, 2022

(65) Prior Publication Data

US 2024/0022320 A1 Jan. 18, 2024

(51) Int. Cl.
| | |
|---|---|
| *H04B 7/185* | (2006.01) |
| *H04W 56/00* | (2009.01) |
| H04W 84/06 | (2009.01) |

(52) U.S. Cl.
CPC ..... *H04B 7/18521* (2013.01); *H04B 7/18513* (2013.01); *H04W 56/009* (2013.01); *H04W 84/06* (2013.01)

(58) Field of Classification Search
CPC ............ H04B 7/18521; H04B 7/18513; H04B 7/18541; H04B 7/18543; H04B 7/1851; H04W 56/009; H04W 84/06
See application file for complete search history.

(56) References Cited

U.S. PATENT DOCUMENTS

| | | | | |
|---|---|---|---|---|
| 10,958,334 | B1 | 3/2021 | Sullivan | |
| 2002/0146983 | A1* | 10/2002 | Scherzer | H04W 16/28 |
| | | | | 455/67.11 |
| 2021/0273719 | A1* | 9/2021 | Wang | H04B 7/18519 |
| 2021/0400556 | A1* | 12/2021 | Määttanen | H04W 36/324 |
| 2022/0007267 | A1* | 1/2022 | Maattanen | H04W 8/26 |

(Continued)

FOREIGN PATENT DOCUMENTS

| | | |
|---|---|---|
| CN | 112929427 A | 6/2021 |

OTHER PUBLICATIONS

Chen Q., et al., "Analysis of Inter-Satellite Link Paths for LEO Mega-Constellation Networks", IEEE Transactions on Vehicular Technology, USA, vol. 70, No. 3, Feb. 9, 2021, pp. 2743-2755, XP011846674, p. 2744-p. 2746.

(Continued)

*Primary Examiner* — Hashim S Bhatti
(74) *Attorney, Agent, or Firm* — Harrity & Harrity, LLP

(57) ABSTRACT

Various aspects of the present disclosure generally relate to wireless communication. In some aspects, a user equipment (UE) may communicate with a non-terrestrial network entity using a radio configuration over a service link. The UE may receive an indication of a topology change event that is to occur in association with an inter-satellite link. The UE may communicate, after the topology change event, using at least part of the radio configuration over the service link. Numerous other aspects are described.

30 Claims, 10 Drawing Sheets

(56) References Cited

U.S. PATENT DOCUMENTS

| | | | |
|---|---|---|---|
| 2022/0052753 A1* | 2/2022 | Speidel | H04W 16/10 |
| 2022/0131603 A1 | 4/2022 | Qiao et al. | |
| 2022/0201027 A1* | 6/2022 | Sullivan | H04L 63/20 |
| 2023/0164089 A1* | 5/2023 | Greene | H04B 7/18521 |
| | | | 709/226 |
| 2023/0412257 A1* | 12/2023 | Rasool | H04L 5/0078 |
| 2024/0349147 A1* | 10/2024 | Li | H04W 36/249 |
| 2024/0389014 A1* | 11/2024 | Li | H04W 48/20 |
| 2025/0193751 A1* | 6/2025 | Alabbasi | H04W 24/02 |

OTHER PUBLICATIONS

International Search Report and Written Opinion—PCT/US2023/070027—ISA/EPO—Oct. 26, 2023.

* cited by examiner

700

710 — Communicate with a non-terrestrial network (NTN) entity using a radio configuration over a service link 720 — Receive an indication of a topology change event that is to occur in association with an inter-satellite link (ISL)

730 — Communicate, after the topology change event, using at least part of the radio configuration over the service link

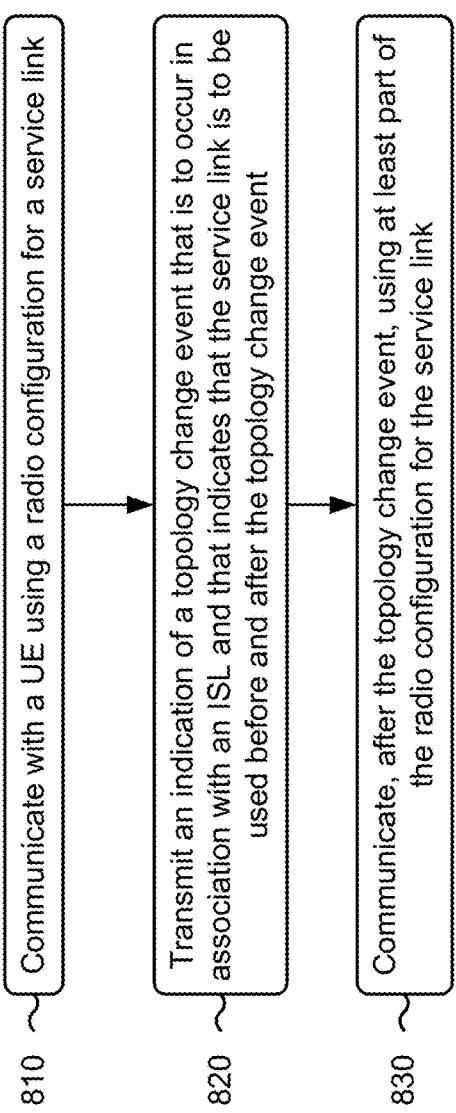

810 — Communicate with a UE using a radio configuration for a service link

820 — Transmit an indication of a topology change event that is to occur in association with an ISL and that indicates that the service link is to be used before and after the topology change event 830 — Communicate, after the topology change event, using at least part of the radio configuration for the service link

CONFIGURATION FOR INTER-SATELLITE LINK

FIELD OF THE DISCLOSURE

Aspects of the present disclosure generally relate to wireless communication and to techniques and apparatuses for using a radio configuration involving an inter-satellite link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include communicating with a non-terrestrial network (NTN) entity using a radio configuration over a service link. The method may include receiving an indication of a topology change event that is to occur in association with an inter-satellite link (ISL). The method may include communicating, after the topology change event, using at least part of the radio configuration over the service link.

Some aspects described herein relate to a method of wireless communication performed by an NTN entity. The method may include communicating with a UE using a radio configuration for a service link. The method may include transmitting an indication of a topology change event that is to occur in association with an ISL and that indicates that the service link is to be used before and after the topology change event. The method may include communicating, after the topology change event, using at least part of the radio configuration for the service link.

Some aspects described herein relate to a UE for wireless communication. The UE may include a memory and one or more processors coupled to the memory. The one or more processors may be configured to communicate with an NTN entity using a radio configuration over a service link. The one or more processors may be configured to receive an indication of a topology change event that is to occur in association with an ISL. The one or more processors may be configured to communicate, after the topology change event, using at least part of the radio configuration over the service link.

Some aspects described herein relate to an NTN for wireless communication. The non-terrestrial network may include a memory and one or more processors coupled to the memory. The one or more processors may be configured to communicate with a UE using a radio configuration for a service link. The one or more processors may be configured to transmit an indication of a topology change event that is to occur in association with an ISL and that indicates that the service link is to be used before and after the topology change event. The one or more processors may be configured to communicate, after the topology change event, using at least part of the radio configuration for the service link.

Some aspects described herein relate to a non-transitory computer-readable medium that stores a set of instructions for wireless communication by a UE. The set of instructions, when executed by one or more processors of the UE, may cause the UE to communicate with an NTN entity using a radio configuration over a service link. The set of instructions, when executed by one or more processors of the UE, may cause the UE to receive an indication of a topology change event that is to occur in association with an ISL. The set of instructions, when executed by one or more processors of the UE, may cause the UE to communicate, after the topology change event, using at least part of the radio configuration over the service link.

Some aspects described herein relate to a non-transitory computer-readable medium that stores a set of instructions for wireless communication by one or more instructions that, when executed by one or more processors of an NTN entity, may cause the NTN entity to communicate with a UE using a radio configuration for a service link. The set of instructions, when executed by one or more processors of the NTN entity, may cause the NTN entity to transmit an indication of a topology change event that is to occur in association with an ISL and that indicates that the service link is to be used before and after the topology change event. The set of instructions, when executed by one or more processors of the NTN entity, may cause the NTN entity to communicate, after the topology change event, using at least part of the radio configuration for the service link.

Some aspects described herein relate to an apparatus for wireless communication. The apparatus may include means for communicating with an NTN entity using a radio configuration over a service link. The apparatus may include means for receiving an indication of a topology change event that is to occur in association with an ISL. The apparatus may include means for communicating, after the topology change event, using at least part of the radio configuration over the service link.

Some aspects described herein relate to an apparatus for wireless communication. The apparatus may include means for communicating with another apparatus using a radio configuration for a service link. The apparatus may include means for transmitting an indication of a topology change event that is to occur in association with an ISL and that indicates that the service link is to be used before and after the topology change event. The apparatus may include means for communicating, after the topology change event, using at least part of the radio configuration for the service link.

Aspects generally include a method, apparatus, system, computer program product, non-transitory computer-readable medium, UE, base station, network entity, NTN entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

4

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by an NTN entity, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
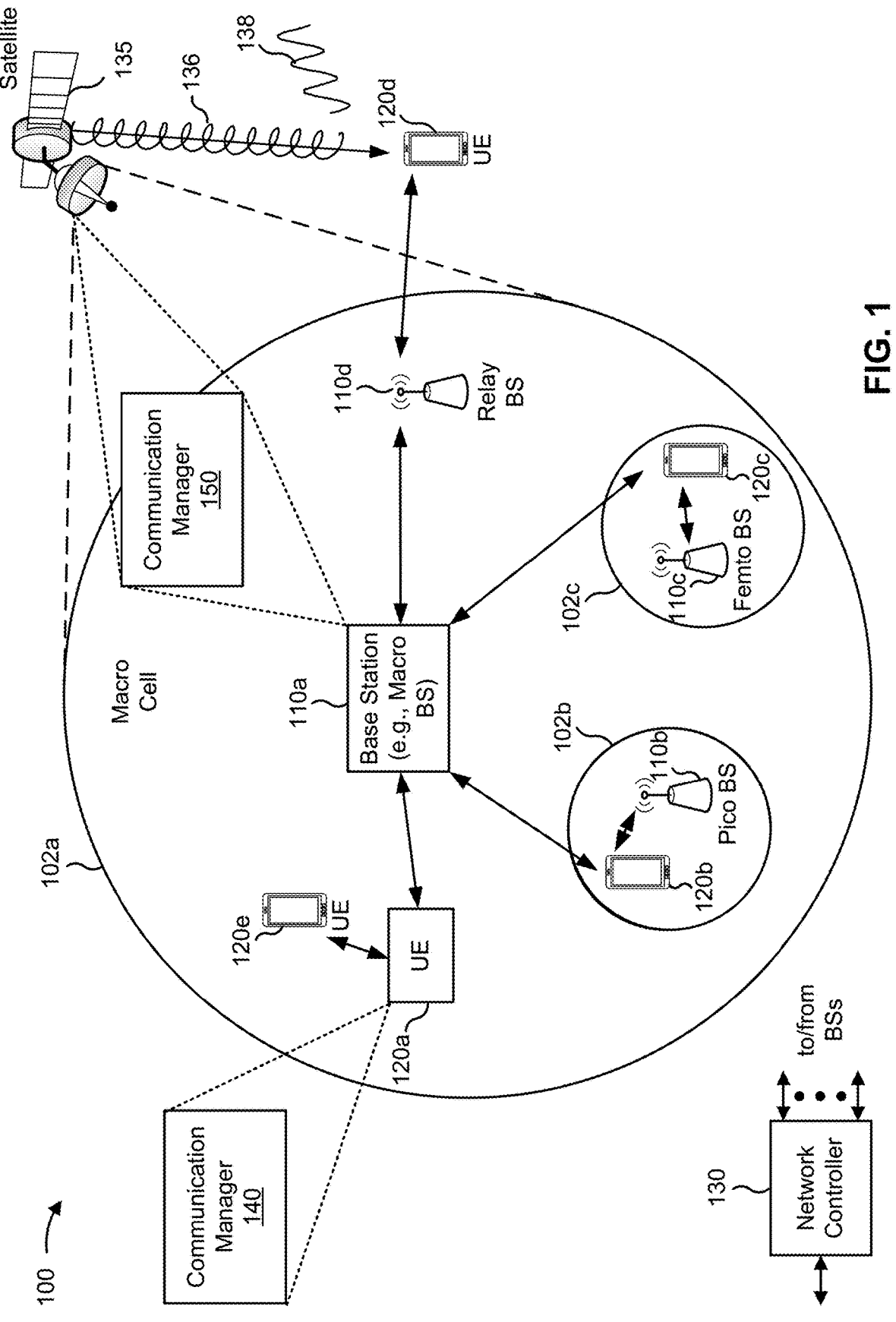
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a ULE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

In some aspects, as shown, a cell may be provided by a network entity (e.g., base station 110) of a non-terrestrial network (NTN). As used herein, "non-terrestrial network" may refer to a network for which access is provided by a non-terrestrial base station, such as a base station carried by a satellite, a balloon, a dirigible, an airplane, an unmanned aerial vehicle, and/or a high altitude platform station. A network entity in an NTN (NTN network entity) may use a polarization. For example, a network entity in a satellite 135 (NTN network entity) may transmit a communication to the UE 120 using a circular polarization 136 or a linear polarization 138. Circular polarization occurs when the tip of the electric field of an electromagnetic wave at a fixed point in space traces a circle, and the electromagnetic wave may be formed by superposing two orthogonal linearly polarized waves of equal amplitude and a 90-degree phase difference. A circular polarization may be a right-hand circular polarization (RHCP) or a left-hand circular polarization (LHCP). Linear polarization occurs when the tip of the electric field of an electromagnetic wave at a fixed point in space oscillates along a straight line over time.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may communicate with an NTN entity using a radio configuration over a service link; receive an indication of a topology change event that is to occur in association with an inter-satellite link (ISL); and communicate, after the topology change event, using at least part of the radio configuration over the service link. Additionally, or alternatively, the communication manager 140 may perform one or more other operations described herein.

In some aspects, an NTN network entity (e.g., base station 110, a network entity, satellite 135) may include a communication manager 150. As described in more detail elsewhere herein, the communication manager 150 may communicate with a UE using a radio configuration for a service link; transmit an indication of a topology change event that is to occur in association with an ISL and that indicates that the service link is to be used before and after the topology change event; and communicate, after the topology change event, using at least part of the radio configuration for the service link. Additionally, or alternatively, the communication manager 150 may perform one or more other operations described herein.

As indicated above, FIG. 1 is provided as an example. Other examples may differ from what is described with regard to FIG. 1.

Figure 2:
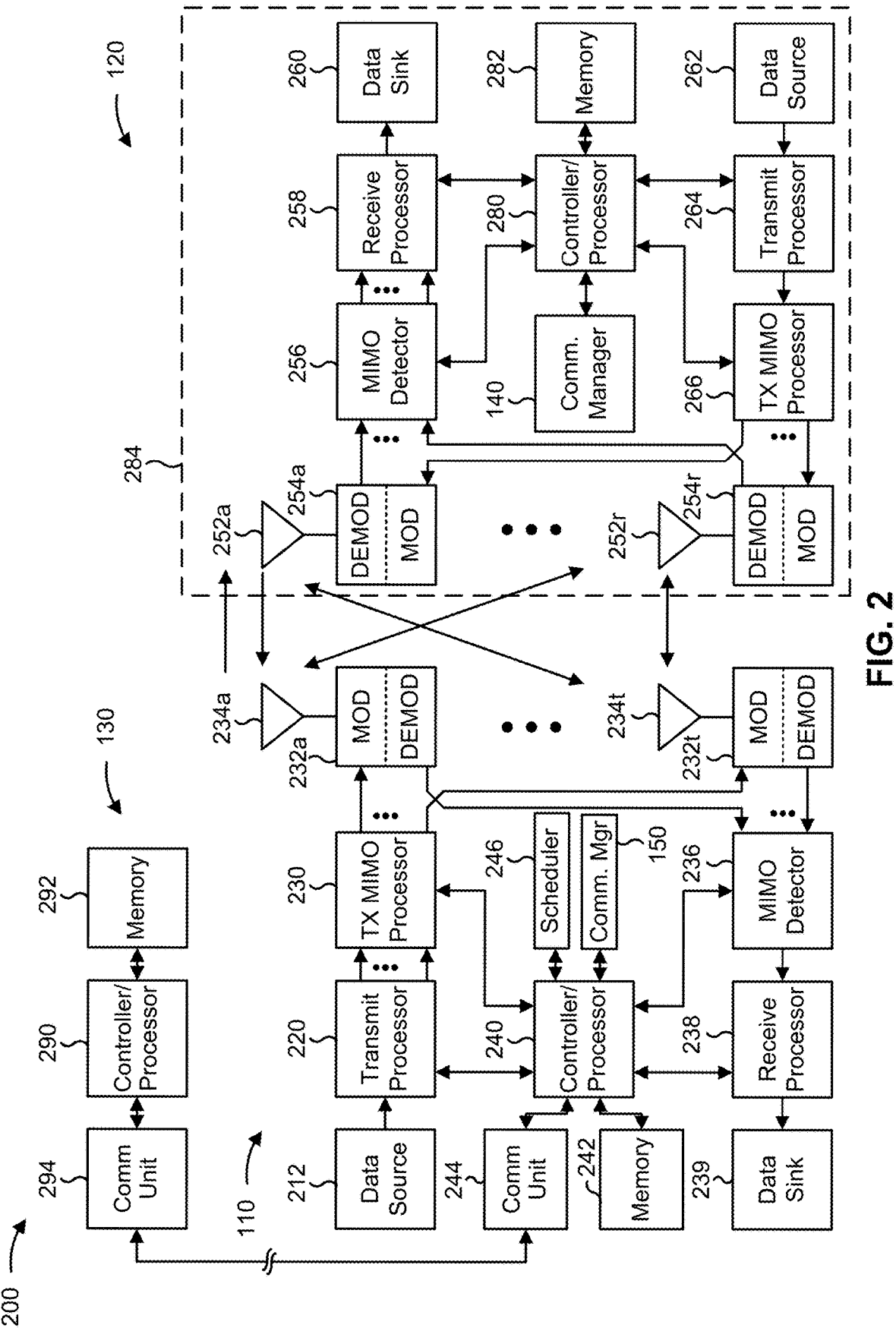
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t. The base station 110 may be an NTN network entity located in a terrestrial location or in a non-terrestrial location (e.g., satellite 135).

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120.

The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

A controller/processor of a network entity, (e.g., the controller/processor 240 of the base station 110), the controller/processor 280 of the UE 120, and/or any other component(s) of FIG. 2 may perform one or more techniques associated with using a radio configuration involving an inter-satellite link, as described in more detail elsewhere herein. In some aspects, the NTN entity is a network entity at the surface or at a satellite (e.g., satellite 135). For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for communicating with an NTN entity using a radio configuration over a service link; means for receiving an indication of a topology change event that is to occur in association with an ISL; and/or means for communicating, after the topology change event, using at least part of the radio configuration over the service link. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an NTN entity (e.g., a base station 110, a network entity, satellite 135) includes means for communicating with a UE using a radio configuration for a service link; means for transmitting an indication of a topology change event that is to occur in association with an ISL and that indicates that the service link is to be used before and after the topology change event; and/or means for communicating, after the topology change event, using at least part of the radio configuration for the service link. In some aspects, the means for the NTN entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
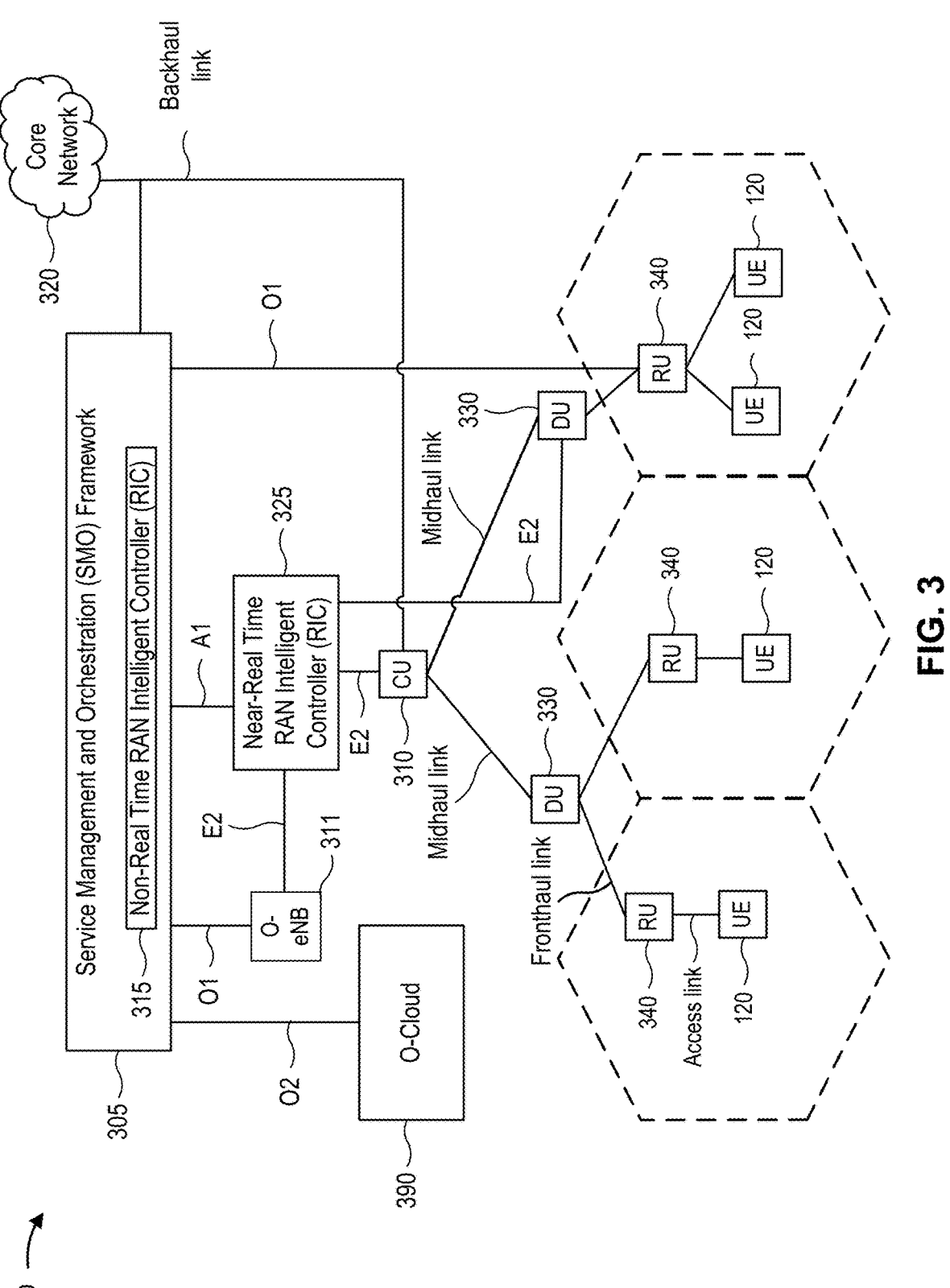
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs")" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (TRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be config-ured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as AI policies).

As indicated above, FIG. 3 is provided as an example. Other examples may differ from what is described with regard to FIG. 3.

Figure 4:
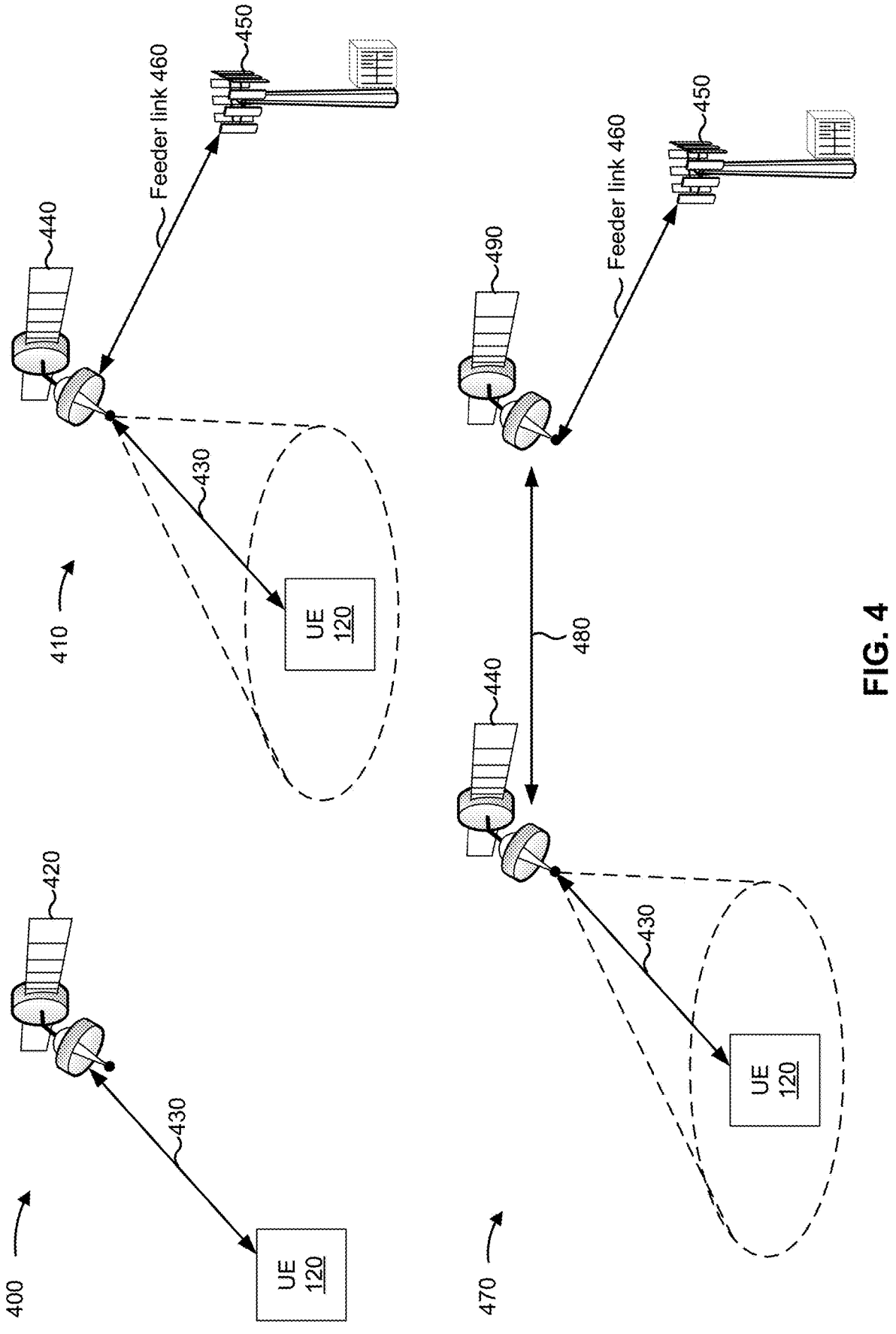
FIG. 4 is a diagram illustrating an example of a regenerative satellite deployment and an example of a transparent satellite deployment in a non-terrestrial network (NTN), in accordance with the present disclosure.

FIG. 4 is a diagram illustrating an example 400 of a regenerative satellite deployment and an example 410 of a transparent satellite deployment in an NTN, in accordance with the present disclosure.

Example 400 shows a regenerative satellite deployment. In example 400, a UE 120 is served by a satellite 420 (e.g., satellite 135) via a service link 430. For example, the satellite 420 may include a network entity (e.g., a base station 110, BS 110a, a gNB). In some aspects, the satellite 420 may be referred to as a non-terrestrial base station, a regenerative repeater, an on-board processing repeater, and/or an NTN entity. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may also be considered to be an NTN entity. The satellite 440 may be a transparent satellite. The satellite 440 may relay a signal received from gateway 450 via a feeder link 460. For example, the satellite may receive an uplink radio frequency transmission and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460 and may amplify and/or filter the uplink radio frequency transmission. In some aspects, the UEs 120 shown in example 400 and example 410 may be associated with a Global Naviga-tion Satellite System (GNSS) capability, a Global Position-ing System (GPS) capability, and/or the like, though not all UEs have such capabilities. The satellite 440 may provide a cell that covers the UE 120.

The service link 430 may include a link between the satellite 440 and the UE 120 and may include one or more of an uplink or a downlink. The feeder link 460 may include a link between the satellite 440 and the gateway 450 and may include one or more of an uplink (e.g., from the UE 120 to the gateway 450) or a downlink (e.g., from the gateway 450 to the UE 120).

The feeder link 460 and the service link 430 may each experience Doppler effects due to the movement of the satellites 420 and 440 and, potentially, movement of a UE 120. These Doppler effects may be significantly larger than in a terrestrial network. The Doppler effect on the feeder link 460 may be compensated to some degree but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

Satellites 420 and 440 may be a satellite in a geostationary orbit (GSO) or geosynchronous equatorial orbit (GEO), which may be, for example, 36,000 kilometers (km) above the Earth. The speed of the satellite with respect to Earth may be negligible but have a round-trip propagation delay of more than 500 milliseconds (ms), as compared to 25 ms for a low Earth orbit (LEO) satellite at 600 km above the Earth. In an NTN, where a distance between UE 120 and a satellite can be larger than 600 km, a pathloss change may not be appropriately reflected in a propagation delay change. The UE 120 is expected to be able to autonomously pre-com-pensate for propagation delay all the way to a reference point, and thus timing advance (TA) validation can be carried out more directly rather than relying on indirect parameters such as RSRP. The UE 120 may use a TA for timing alignment of communications due to a propagation delay. The TA may inform the UE 120 to transmit a communication in uplink earlier than a reference downlink slot timing by the TA amount. The TA may need to be validated if the propagation distance between the UE 120 and the network entity changes. In addition, a satellite may not be always available to the UE 120 if the satellite is in a non-geostationary orbit (NGSO).

Some satellite operators may deploy satellite access with intentional coverage gaps, or discontinuous coverage (DC). DC may be involve LEO satellites, IoT networks, or a satellite constellation that does not cover a particular loca-tion on Earth all of the time. Some services may be delay tolerant and may use DC. Such services may include ser-vices for IoT devices and networks, services for utility meters, or services that use sensors. DC may be used to address service availability and power consumption. In addition to DC, the feeder link 460 may have intermittent connectivity with a ground station, such as gateway 450. There may be some areas where it is not feasible to deploy a ground station, either due to deployment designs and/or costs.

To deal with unavailability of the feeder link 460, a satellite transmitter may include network elements at the satellite 420/440. Both the radio network and the core network aspects may be mounted on the satellite 420/440. In one scenario, the entire control plane and user plane paths may be mounted on the satellite 420/440. For example, the control plane management entity (e.g., mobile management entity (MME) in 4G or an access and mobility management function (AMF) and a session management function (SMF) in NR) as well as the user plane path (e.g., serving gateway (GW) and packet data network GW for 4G or a user plane function in NR) may be mounted on the satellite 420/440. In this scenario, the ground station (e.g., gateway 450) may include the home subscriber services (HSS) including sub-scription management, user authentication and authoriza-tion. Also, in this scenario, some portions of the control plane path can be at the ground station (e.g., coordination between the control plane management entities in different satellites, buffering of user data and control plane data while FL is unavailable). In this scenario, there may also be user data plane and control plane data buffering at the satellite due to DC. Finally, the internet connection for the data plane may be at the ground station. Other functional splits between the satellite transmitter, and the ground station may be employed.

Example 470 shows use of an ISL 480 between satellite 440 and satellite 490. The ISL 480 may be used to support coverage extension in the NTN. For example, if gateway 450 is deployed with certain limitations and satellite 440 does not have a direct feeder link connection to gateway 450, satellite 440 may be connected with the ISL 480 to satellite 490, which has the feeder link 460. In this way, satellite 440 has access to the feeder link 460 and service availability improves.

As indicated above, FIG. 4 is provided as an example. Other examples may differ from what is described with regard to FIG. 4.

Figure 5:
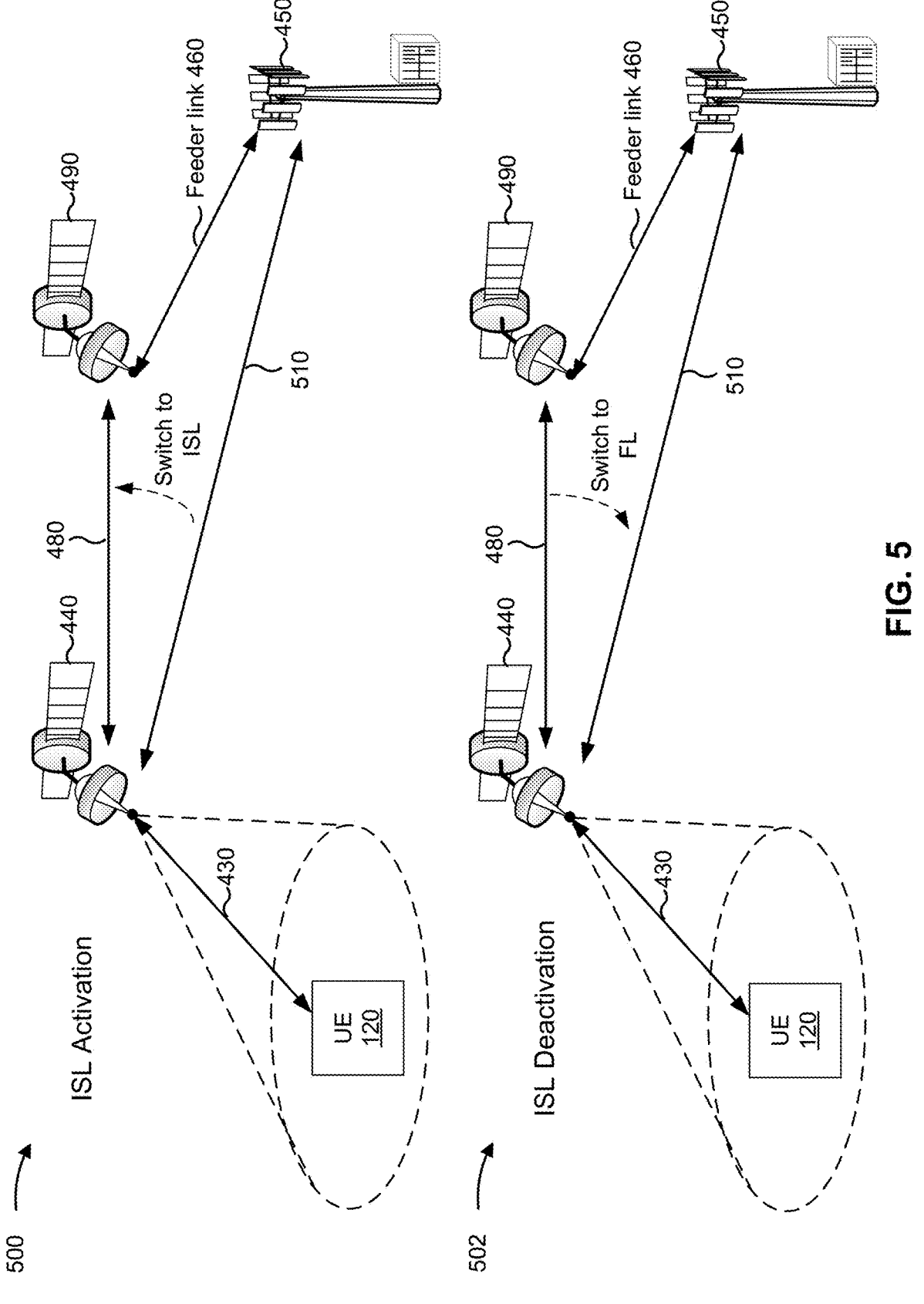
FIG. 5 is a diagram illustrating an example of ISL activation and an example of inter-satellite link (ISL) deactivation, in accordance with the present disclosure.

FIG. 5 is a diagram illustrating an example 500 of ISL activation and an example 502 of ISL deactivation, in accordance with the present disclosure.

Example 500 shows that satellite 440 may have a feeder link 510. However, a topology change event may occur, where there is a change in a communication path in the NTN topology. This may include a change in a link that is used or a change in an operation of an NTN entity. In example 500, the topology change event is an ISL activation, where satellite 440 no longer uses feeder link 510 and switches to use of the ISL 480 to peer satellite 490. This may be due to satellite 440 moving to a location where there is no line of sight to the gateway 450. From the viewpoint of the UE, the connection or communication path between satellite 440 and the gateway 450 may be an extended feeder link, even though the communication path proceeds through the ISL 480 and satellite 490.

Example 502 shows that a topology change event may be an ISL deactivation, where satellite switches from using the ISL 480 to using the feeder link 510. For example, satellite 440 or the network may determine that satellite 440 has or will have a line of sight with the gateway 450. In other words, satellite 440 may activate use of the ISL 480 when moving further away from the gateway 450 and deactivate use of the ISL 480 when moving closer to the gateway 450.

The UE 120 may use the same serving satellite (e.g., satellite 440) before and after an ISL activation or deactivation. Accordingly, the UE 120 may use the same service link 430 to satellite 440 before and after the ISL activation or deactivation. In other words, only the feeder link of satellite 440 changes before and after the ISL activation or deactivation. However, even though the service link 430 and satellite 440 has not changed for the UE 120, the NTN may change the physical cell ID (PCI) after ISL activation or deactivation. In this scenario, the UE 120 detects a different cell before and after the ISL activation or deactivation. Consequently, the UE 120 may perform legacy mobility-related procedures to handle the ISL activation or deactivation. This may include reusing an RRC reestablishment procedure, a (conditional) handover procedure, and/or a cell reselection procedure. Such procedures involve a great amount of signaling in order for the UE 120 to reacquire uplink synchronization and access the new cell, as well as obtaining communication configuration parameters. The signaling may include, such as signaling for a random access procedure, signaling for a new RRC configuration, or signaling/procedure to reset protocol stack layers of the UE 120.

Furthermore, the current system information (SI) update procedure is not sufficient to support the considered ISL activation or deactivation procedure. For example, when satellite 440 activates the ISL 480, there may be a sudden propagation duration increase over the feeder link 460. There would be a time gap between the last slot before the ISL activation and the first slot after the ISL activation. This time gap cannot be handled by the current SI update procedure.

As indicated above, FIG. 5 is provided as an example. Other examples may differ from what is described with regard to FIG. 5.

Figure 6:
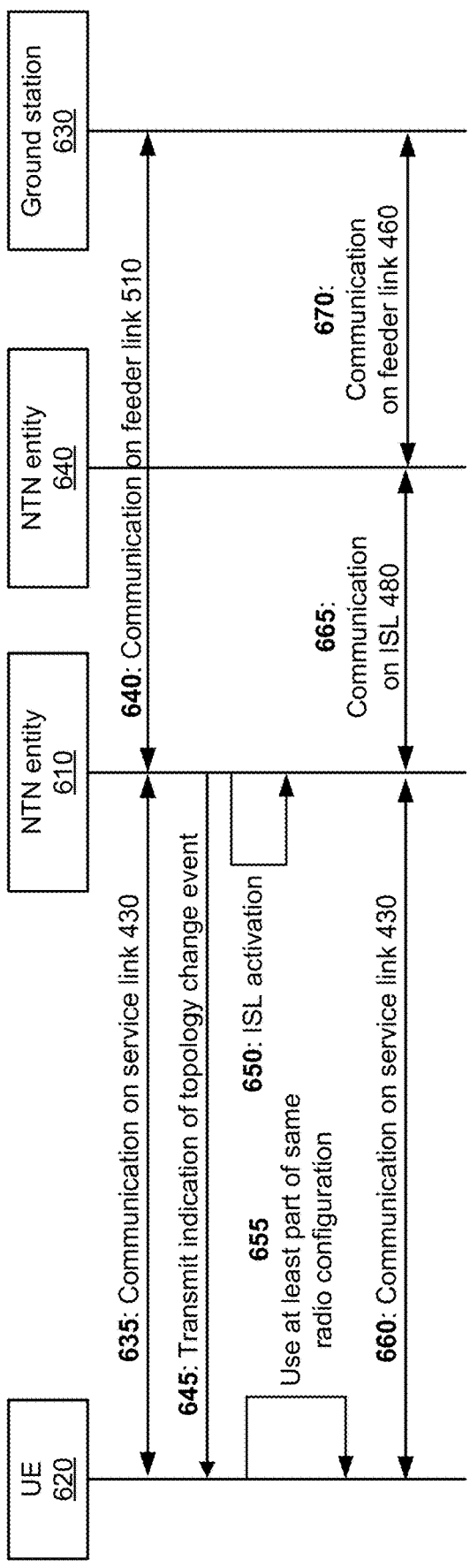
FIG. 6 is a diagram illustrating an example of indicating a topology change event, in accordance with the present disclosure.

FIG. 6 is a diagram illustrating an example 600 of indicating a topology change event, in accordance with the present disclosure. As shown in FIG. 6, an NTN entity 610 (e.g., base station 110, network entity, satellite 420, satellite 440) and a UE 620 (e.g., UE 120) may communicate with one another. The UE 620 and a terrestrial network entity (e.g., ground station 630) may communicate via the NTN entity 610. There may be another NTN entity 640 (e.g., base station 110, network entity, satellite 420, satellite 490) that has a feeder link (e.g., feeder link 460) to the terrestrial network entity, and there may be an ISL (e.g., ISL 480) that is activated or deactivated between NTN entity 610 and NTN entity 640.

According to various aspects described herein, the UE 620 and the NTN entity 610 may use a lighter signaling procedure to reduce signaling overhead and service interruption time when a topology change event occurs in association with an ISL. For example, the UE 620 may receive an indication of a topology change event that is to occur. The topology change event may be an ISL activation. The UE 620 may use a radio configuration for the service link before the ISL activation. The UE 620 may then use at least part of the same radio configuration for the service link after the ISL activation. This is because some parameters of the radio configuration may remain valid (applicable) both before and after the ISL activation, since the same service link remains before and after the ISL activation. Such parameters (first set of parameters) may include a satellite ephemeris, a closed-loop timing advance, frequency compensation of the service link, a hybrid automatic repeat request (HARQ) process configuration, a serving cell or beam antenna polarization, a last reported timing advance for the service link, and/or a last reported location of the UE 620.

The UE 620 may determine update information (e.g., new values) for parameters that may change or not remain valid after the ISL activation. Such parameters (second set of parameters) may include a common timing advance parameter, a slot timing parameter that indicates a time gap between a last slot before the topology change event and a first slot after the topology change event, a serving cell measurement, a $K_{mac}$ timing parameter, $K_{offset}$ parameter, a synchronization signal block (SSB) measurement timing configuration, a measurement gap configuration, and/or a conditional handover configuration. The $K_{mac}$ timing parameter may be a feeder link round trip time between a network entity (e.g., base station 110) and a reference point where the uplink slot timing and the downlink slot timing are aligned. The $K_{offset}$ parameter may be a timing offset that is used to enhance the timing relationship between uplink transmission and downlink reception in order to handle the large TA valued applied by the UE 620. For example, $K_{offset}$ is added to a time parameter $K_2$ to determine the number of slots between the downlink slot where the UE 620 receives a command (e.g., scheduling downlink control information (DCI), a MAC control element (MAC CE)) and the uplink slot for applying the command (e.g., transmission). $K_2$ together with $K_{offset}$ may give the UE 620 sufficient time to process a command and/or prepare for a transmission, although the UE 620 applies a large TA, which is equal to the round trip time between the UE 620 and the reference point.

Example 600 shows the UE 620 receiving the indication of the topology change event and using at least part of the same radio configuration, to use less signaling than is currently used for a topology change event. The topology change event may be an ISL activation, an ISL deactivation, or another action involving the ISL. In example 600, the topology change event is an ISL activation.

As shown by reference number 635, the UE 620 and NTN entity 610 may communicate using the service link 430 shown in FIG. 5. As shown by reference number 640, NTN entity 610 may communicate with the ground station 630 using the feeder link 510 shown in FIG. 5. NTN entity 610 and/or ground station 630 may determine, based on a schedule or other information, that NTN entity 610 may not be able to use the feeder link 510. As shown by reference number 645, NTN entity 610 and/or ground station 630 may transmit an indication of the topology change event (e.g., ISL activation) to the UE 620. The indication may be received in an SIB, which may be NTN-specific or dedicated for NTN. The indication may be received in DCI, a MAC CE, or an RRC message. The indication may be received via a short message over a physical downlink control channel (PDCCH) in a paging occasion (e.g., for RRC inactive or RRC idle UE). The indication may be received in a dedicated RRC message for RRC connected UE. For example, the indication may be a handover command, where the target cell identifier (ID) contained in the handover command indicates the same cell ID as the UE 620's current serving cell over the service link 430 before the topology change event. Thus, if the UE 620 receives a handover command that requests the UE 620 to hand over to the current serving cell, the UE 620 may detect the indication.

In some aspects, the indication may include a timing of the topology change event (explicitly or implicitly), such as how much time before the topology change event occurs, when the topology change event occurs, and/or how long the topology change event will last.

The indication may indicate the first set of parameters and/or the second set of parameters. The first set of parameters that remain the same before and after the topology change event may include a satellite ephemeris, $N_{TA}$ value at the UE, downlink and/or uplink frequency compensation of the service link, a HARQ process configuration (e.g., whether a downlink HARQ process is HARQ feedback enabled or disabled, an uplink HARQ process's HARQ state or mode), a serving cell's/beam's downlink and/or uplink antenna polarization, the UE 620's last reported service link TA, and/or the UE 620's last reported location used in determining to trigger an update report.

The second set of parameters that are updated or changed at the UE after the topology change event may include TA_common parameters, a downlink or uplink slot timing (e.g., to handle the time gap between the last slot before the ISL is activated and the first slot after the ISL is activated), a reset of the serving cell's measurement, $K_{mac}$, UE-specific and/or cell-specific $K_{offset}$, an SSB measurement timing configuration (SMTC), a measurement gap configuration, and/or conditional handover configuration (CHO). Some parameters may be updated explicitly or implicitly based on the explicitly updated parameters. For example, the UE 620 may infer the updated $K_{offset}$ by considering the difference between the old TA_common parameters and the updated TA_common parameters updated by network explicitly. In another example, the UE 620 may update the time window of the SMTC, and/or measurement gap, based at least in part on the time difference of the serving cell's downlink slot timing before and after the ISL activation or deactivation.

The indication may include one or more bits or an information element (IE). For example, the SIB may include a one-bit flag in an NTN-specific SIB (e.g., IE t-Service). If the one-bit flag is set, the UE 620 may determine that the SIB indicates the topology change event. Additionally or alternatively, the UE 620 may determine the IE t-Service refers to the timing of ISL activation or deactivation and that the same service link will continue to serve the UE 620 after the ISL activation or deactivation. Note that in current NTN designs, the IE t-Service refers to the timing when the current cell stops serving the area. Alternatively, a new IE may be included in the NTN-specific SIB to indicate the timing for the ISL activation or deactivation.

As shown by reference number 650, NTN entity 610 may activate the ISL, such as ISL 480 shown in FIG. 5. As shown by reference number 655, for the communication after the topology change event at step 660, the UE 620 may keep using at least part of the same radio configuration used for communication at steps 635 and 640. In some aspects, the UE 620 may determine the radio configuration parameters that are still valid after the ISL activation based at least in part on the indication. This may enable the UE 620 to skip some procedures or to use smaller, modified procedures with less signaling and with less delay. For example, in some aspects, since the closed loop TA adjustment value (i.e. $N_{TA}$ value) at the UE 620 remains valid and the impact of the ISL activation or deactivation may be already included in the updated TA_common parameters, the UE 620 may skip the random access procedure after ISL activation or deactivation, which may further save additional signaling and reduce the service interruption time. The UE 620 may use the part of the same radio configuration (same first set of parameters) to communicate with ground station 630 via the ISL 480. The UE 620 may determine or receive update information about what part of the radio configuration is to be modified or updated. The UE 620 may determine updated parameters or receive updated parameters. In one option, some of the parameters may or may not need to be updated. This may depend on if a new configuration is not provided by the network. For example, the UE 620 may wait to see if a new configuration is provided within certain time period. If the new configuration is not provided within the time period, the UE 620 may reuse the old configuration. Otherwise, the UE 620 may apply the new configuration.

As shown by reference number 660, the UE 620 may communicate on the same service link 430 using part of the same radio configuration and any updated parameters. As shown by reference number 665, NTN entity 610 may communicate with NTN entity 640 over the ISL 480. As shown by reference number 670, NTN entity 640 may communicate with the ground station 630 using the feeder link 460.

By indicating a topology change event and configuring the UE 620 to use the same service link and part of the same radio configuration, the NTN and the UE 620 may improve communication services while reducing latency and conserving processing resources and signaling resources.

As indicated above, FIG. 6 is provided as an example. Other examples may differ from what is described with regard to FIG. 6.

Figure 7:
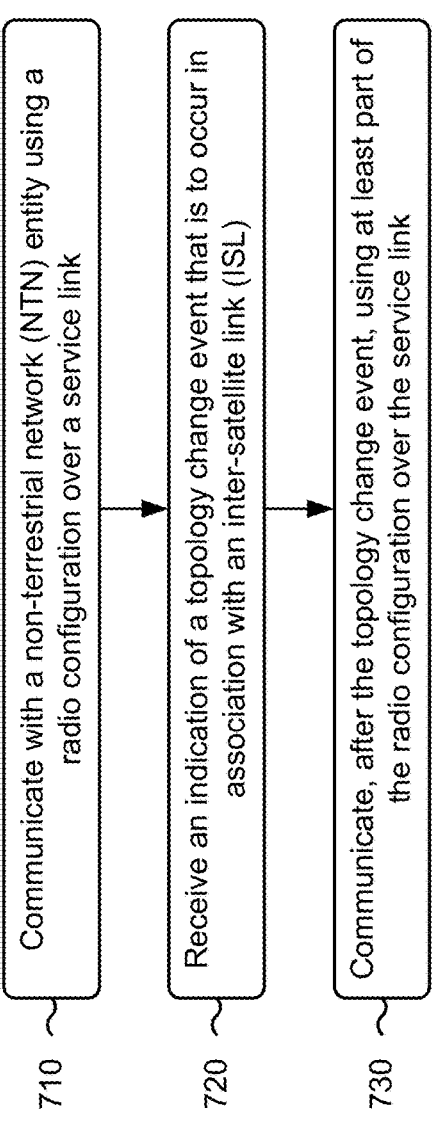
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120, UE 620) performs operations associated with using a same radio configuration before and after a topology change event that is associated with an ISL.

As shown in FIG. 7, in some aspects, process 700 may include communicating with an NTN entity using a radio configuration over a service link (block 710). For example, the UE (e.g., using communication manager 908, reception component 902, and/or transmission component 904 depicted in FIG. 9) may communicate with an NTN entity using a radio configuration over a service link, as described above.

As further shown in FIG. 7, in some aspects, process 700 may include receiving an indication of a topology change event that is to occur in association with an ISL (block 720). For example, the UE (e.g., using communication manager 908 and/or reception component 902 depicted in FIG. 9) may receive an indication of a topology change event that is to occur in association with an ISL, as described above.

As further shown in FIG. 7, in some aspects, process 700 may include communicating, after the topology change event, using at least part of the radio configuration over the service link (block 730). For example, the UE (e.g., using communication manager 908, reception component 902, and/or transmission component 904 depicted in FIG. 9) may communicate, after the topology change event, using at least part of the radio configuration over the service link, as described above.

Process 700 may include additional aspects, such as any single aspect or any combination of aspects described below and/or in connection with one or more other processes described elsewhere herein.

In a first aspect, the indication indicates that the service link is to be used before and after the topology change event.

In a second aspect, alone or in combination with the first aspect, the topology change event is an activation or deactivation of the ISL.

In a third aspect, alone or in combination with one or more of the first and second aspects, the at least part of the radio configuration includes a first set of parameters that are valid both before and after the topology change event.

In a fourth aspect, alone or in combination with one or more of the first through third aspects, the first set of parameters include one or more of satellite ephemeris information, a closed-loop TA, frequency compensation of the service link, a HARQ process configuration, a serving cell or beam antenna polarization, a last reported TA for the service link, or a last reported location of the UE.

In a fifth aspect, alone or in combination with one or more of the first through fourth aspects, process 700 includes determining update information for a second set of parameters of the radio configuration that are not valid after the topology change event, and updating the second set of parameters based at least in part on the update information.

In a sixth aspect, alone or in combination with one or more of the first through fifth aspects, determining the update information includes receiving the update information.

In a seventh aspect, alone or in combination with one or more of the first through sixth aspects, the second set of parameters include one or more of a common timing advance parameter, a slot timing parameter that indicates a time gap between a last slot before the topology change event and a first slot after the topology change event, a serving cell measurement, a $K_{mac}$ timing parameter, $K_{offset}$ parameter, an SSB measurement timing configuration, a measurement gap configuration, or a conditional handover configuration.

In an eighth aspect, alone or in combination with one or more of the first through seventh aspects, the indication indicates a timing of the topology change event.

In a ninth aspect, alone or in combination with one or more of the first through eighth aspects, receiving the indication includes receiving the indication via an SIB.

In a tenth aspect, alone or in combination with one or more of the first through ninth aspects, the SIB is NTN-specific.

In an eleventh aspect, alone or in combination with one or more of the first through tenth aspects, the indication includes one or more bits or an information element in the SIB.

In a twelfth aspect, alone or in combination with one or more of the first through eleventh aspects, receiving the indication includes receiving the indication via DCI, a MAC CE, or an RRC message.

In a thirteenth aspect, alone or in combination with one or more of the first through twelfth aspects, receiving the indication includes receiving the indication via a short message over a PDCCH in a paging occasion.

In a fourteenth aspect, alone or in combination with one or more of the first through thirteenth aspects, the indication indicates a first set of parameters that are to remain the same after the topology change event.

In a fifteenth aspect, alone or in combination with one or more of the first through fourteenth aspects, the indication indicates a second set of parameters that are to be updated after the topology change event.

In a sixteenth aspect, alone or in combination with one or more of the first through fifteenth aspects, process 700 includes skipping a random access procedure after the topology change event.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by an NTN entity, in accordance with the present disclosure. Example process 800 is an example where the NTN entity (e.g., base station 110, satellite 420/440, NTN entity 610) performs operations associated with indicating a topology change event.

As shown in FIG. 8, in some aspects, process 800 may include communicating with a UE using a radio configuration for a service link (block 810). For example, the NTN entity (e.g., using communication manager 1008, reception component 1002, and/or transmission component 1004 depicted in FIG. 10) may communicate with a UE using a radio configuration for a service link, as described above.

As further shown in FIG. 8, in some aspects, process 800 may include transmitting an indication of a topology change event that is to occur in association with an ISL and that indicates that the service link is to be used before and after the topology change event (block 820). For example, the NTN entity (e.g., using communication manager 1008 and/or transmission component 1004 depicted in FIG. 10) may transmit an indication of a topology change event that is to occur in association with an ISL and that indicates that the service link is to be used before and after the topology change event, as described above.

As further shown in FIG. 8, in some aspects, process 800 may include communicating, after the topology change event, using at least part of the radio configuration for the service link (block 830). For example, the NTN entity (e.g., using communication manager 1008, reception component 1002, and/or transmission component 1004 depicted in FIG. 10) may communicate, after the topology change event, using at least part of the radio configuration for the service link, as described above.

Process 800 may include additional aspects, such as any single aspect or any combination of aspects described below and/or in connection with one or more other processes described elsewhere herein.

In a first aspect, the topology change event is an activation or deactivation of the ISL.

In a second aspect, alone or in combination with the first aspect, the at least part of the radio configuration includes a first set of parameters that are valid both before and after the topology change event.

In a third aspect, alone or in combination with one or more of the first and second aspects, the first set of parameters include one or more of satellite ephemeris information, a closed-loop TA, frequency compensation of the service link, a HARQ process configuration, a serving cell or beam antenna polarization, a last reported TA for the service link, or a last reported location of the UE.

In a fourth aspect, alone or in combination with one or more of the first through third aspects, process 800 includes transmitting update information for a second set of parameters of the radio configuration that are not valid after the topology change event.

In a fifth aspect, alone or in combination with one or more of the first through fourth aspects, the second set of parameters include one or more of a common TA parameter, a slot timing parameter that indicates a time gap between a last slot before the topology change event and a first slot after the topology change event, a serving cell measurement, a $K_{mac}$ timing parameter, a $K_{offset}$ parameter, an SSB measurement timing configuration, a measurement gap configuration, or a conditional handover configuration.

In a sixth aspect, alone or in combination with one or more of the first through fifth aspects, the indication indicates a timing of the topology change event.

In a seventh aspect, alone or in combination with one or more of the first through sixth aspects, transmitting the indication includes transmitting the indication via an NTN-specific SIB.

In an eighth aspect, alone or in combination with one or more of the first through seventh aspects, transmitting the indication includes transmitting the indication via DCI, a MAC CE, or an RRC message.

In a ninth aspect, alone or in combination with one or more of the first through eighth aspects, transmitting the indication includes transmitting the indication via a short message over a PDCCH in a paging occasion.

In a tenth aspect, alone or in combination with one or more of the first through ninth aspects, the indication indicates a first set of parameters that are to remain the same after the topology change event.

In an eleventh aspect, alone or in combination with one or more of the first through tenth aspects, the indication indicates a second set of parameters that are to be updated after the topology change event.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

While the described examples include satellites, the aspects described herein may also apply to links and topology change events involving other NTN entities, such as drones, unmanned aerial vehicles, and/or high altitude platforms.

Figure 9:
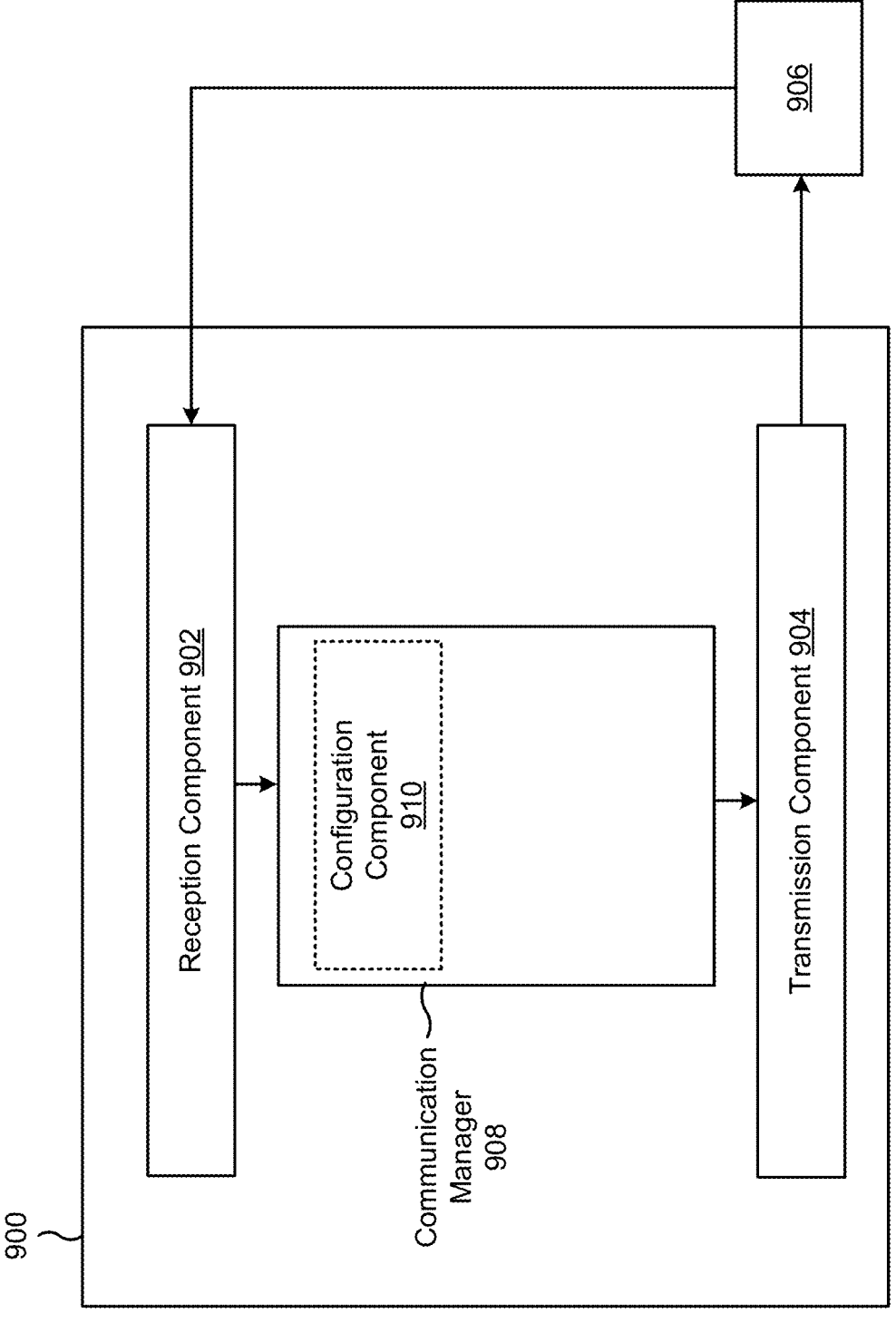
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a UE (e.g., a UE 120, UE 620), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE described in connection with FIG. 2. The communication manager 908 may be, or be similar to, the communication manager 908 depicted in FIGS. 1 and 2. For example, in some aspects, the communication manager 908 may be configured to perform one or more of the functions described as being performed by the communication manager 908. In some aspects, the communication manager 908 may include the reception component 902 and/or the transmission component 904. The communication manager 140 may include a configuration component 910, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 and the transmission component 904 may communicate with an NTN entity using a radio configuration over a service link. The reception component 902 may receive an indication of a topology change event that is to occur in association with an ISL. The reception component 902 and the transmission component 904, after the topology change event, using at least part of the radio configuration over the service link. The configuration component 910 may determine how to reuse part of the radio configuration that was used before the topology change event. The configuration component 910 may determine update information for a second set of parameters of the radio configuration that are not valid after the topology change event. The configuration component 910 may update the second set of parameters based at least in part on the update information. The configuration component 910 may skip a random access procedure after the topology change event.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
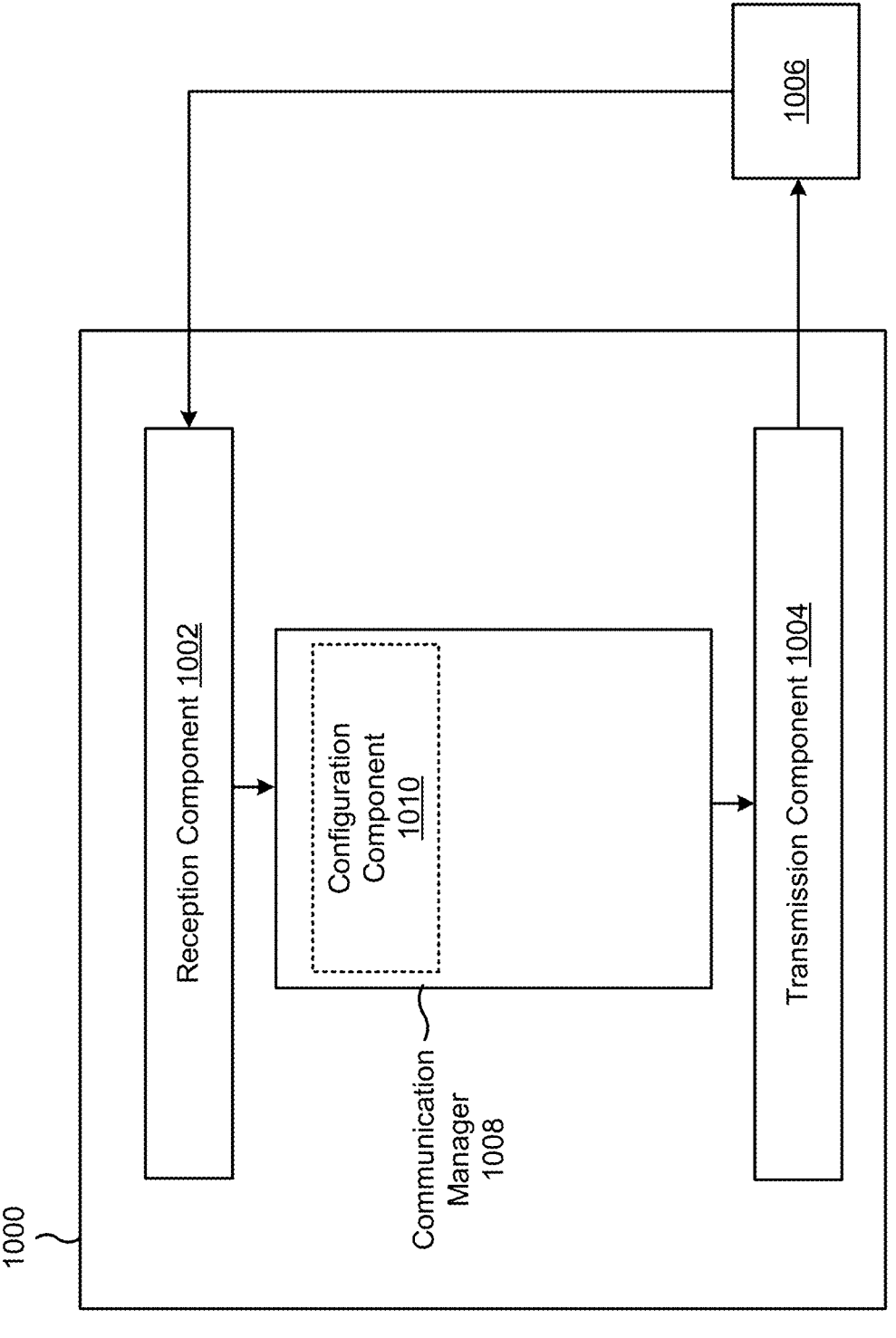

FIG. 10 is a diagram of an example apparatus 1000 for wireless communication, in accordance with the present disclosure. The apparatus 1000 may be an NTN entity (e.g., base station 110, satellite 420/440, NTN entity 610), or an NTN entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the network entity described in connection with FIG. 2.

The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 and/or the transmission component 1004. The communication manager 1008 may include a configuration component 1010, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the NTN entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the NTN entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the NTN entity described in connection with FIG. 2. In some aspects, the transmission component 1004 may be co-located with the reception component 1002 in a transceiver.

The reception component 1002 and transmission component 1004 may communicate with a UE using a radio configuration for a service link. The transmission component 1004 may transmit an indication of a topology change event that is to occur in association with an ISL and that indicates that the service link is to be used before and after the topology change event. The configuration component 910 may generate the indication. The reception component 1002 and transmission component 1004 may communicate, after the topology change event, using at least part of the radio configuration for the service link. The transmission component 1004 may transmit update information for a second set of parameters of the radio configuration that are not valid after the topology change event.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: communicating with an NTN entity using a radio configuration over a service link; receiving an indication of a topology change event that is to occur in association with an inter-satellite link (ISL); and communicating, after the topology change event, using at least part of the radio configuration over the service link.

Aspect 2: The method of Aspect 1, wherein the indication indicates that the service link is to be used before and after the topology change event.

Aspect 3: The method of Aspect 1 or 2, wherein the topology change event is an activation or deactivation of the ISL.

Aspect 4: The method of any of Aspects 1-3, wherein the at least part of the radio configuration includes a first set of parameters that are valid both before and after the topology change event.

Aspect 5: The method of Aspect 4, wherein the first set of parameters include one or more of satellite ephemeris information, a closed-loop timing advance, frequency compensation of the service link, a hybrid automatic repeat request process configuration, a serving cell or beam antenna polarization, a last reported timing advance for the service link, or a last reported location of the UE.

Aspect 6: The method of Aspect 5, further comprising: determining update information for a second set of parameters of the radio configuration that are not valid after the topology change event; and updating the second set of parameters based at least in part on the update information.

Aspect 7: The method of Aspect 6, wherein determining the update information includes receiving the update information.

Aspect 8: The method of Aspect 6 or 7, wherein the second set of parameters include one or more of a common timing advance parameter, a slot timing parameter that indicates a time gap between a last slot before the topology change event and a first slot after the topology change event, a serving cell measurement, a K_mac timing parameter, K_offset parameter, a synchronization signal block measurement timing configuration, a measurement gap configuration, or a conditional handover configuration.

Aspect 9: The method of any of Aspects 1-8, wherein the indication indicates a timing of the topology change event.

Aspect 10: The method of any of Aspects 1-9, wherein receiving the indication includes receiving the indication via a system information block (SIB).

Aspect 11: The method of Aspect 10, wherein the SIB is NTN-specific.

Aspect 12: The method of Aspect 10 or 11, wherein the indication includes one or more bits or an information element in the SIB.

Aspect 13: The method of any of Aspects 1-12, wherein receiving the indication includes receiving the indication via downlink control information, a medium access control control element, or a radio resource control message.

Aspect 14: The method of any of Aspects 1-13, wherein receiving the indication includes receiving the indication via a short message over a physical downlink control channel in a paging occasion.

Aspect 15: The method of any of Aspects 1-14, wherein the indication indicates a first set of parameters that are to remain the same after the topology change event.

Aspect 16: The method of any of Aspects 1-15, wherein the indication indicates a second set of parameters that are to be updated after the topology change event.

Aspect 17: The method of any of Aspects 1-16, further comprising skipping a random access procedure after the topology change event.

Aspect 18: A method of wireless communication performed by a non-terrestrial network (NTN) entity, comprising: communicating with a user equipment (UE) using a radio configuration for a service link; transmitting an indication of a topology change event that is to occur in association with an inter-satellite link (ISL) and that indicates that the service link is to be used before and after the topology change event; and communicating, after the topology change event, using at least part of the radio configuration for the service link.

Aspect 19: The method of Aspect 18, wherein the topology change event is an activation or deactivation of the ISL.

Aspect 20: The method of Aspect 18 or 19, wherein the at least part of the radio configuration includes a first set of parameters that are valid both before and after the topology change event.

Aspect 21: The method of Aspect 20, wherein the first set of parameters include one or more of satellite ephemeris information, a closed-loop timing advance, frequency compensation of the service link, a hybrid automatic repeat request process configuration, a serving cell or beam antenna polarization, a last reported timing advance for the service link, or a last reported location of the UE.

Aspect 22: The method of Aspect 21, further comprising transmitting update information for a second set of parameters of the radio configuration that are not valid after the topology change event.

Aspect 23: The method of Aspect 22, wherein the second set of parameters include one or more of a common timing advance parameter, a slot timing parameter that indicates a time gap between a last slot before the topology change event and a first slot after the topology change event, a serving cell measurement, a K_mac timing parameter, a K_offset parameter, a synchronization signal block measurement timing configuration, a measurement gap configuration, or a conditional handover configuration.

Aspect 24: The method of any of Aspects 18-23, wherein the indication indicates a timing of the topology change event.

Aspect 25: The method of any of Aspects 18-24, wherein transmitting the indication includes transmitting the indication via an NTN-specific system information block (SIB).

Aspect 26: The method of any of Aspects 18-25, wherein transmitting the indication includes transmitting the indication via downlink control information, a medium access control control element, or a radio resource control message.

Aspect 27: The method of any of Aspects 18-26, wherein transmitting the indication includes transmitting the indication via a short message over a physical downlink control channel in a paging occasion.

Aspect 28: The method of any of Aspects 18-27, wherein the indication indicates a first set of parameters that are to remain the same after the topology change event.

Aspect 29: The method of any of Aspects 18-28, wherein the indication indicates a second set of parameters that are to be updated after the topology change event.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

communicate with a non-terrestrial network (NTN) entity using a radio configuration over a service link;

receive, by the UE and from the NTN entity, an indication of a topology change event that is to occur, wherein the topology change event includes a change in an inter-satellite link (ISL), and the indication includes a timing of the topology change event; and communicate, after the topology change event, using at least part of the radio configuration over the service link.

2. The UE of claim 1, wherein the indication indicates that the service link is to be used before and after the topology change event.

3. The UE of claim 1, wherein the topology change event is an activation or deactivation of the ISL.

4. The UE of claim 1, wherein the at least part of the radio configuration includes a first set of parameters that are valid both before and after the topology change event.

5. The UE of claim 4, wherein the first set of parameters include one or more of satellite ephemeris information, a closed-loop timing advance, frequency compensation of the service link, a hybrid automatic repeat request process configuration, a serving cell or beam antenna polarization, a last reported timing advance for the service link, or a last reported location of the UE.

6. The UE of claim 5, wherein the one or more processors are configured to:

determine update information for a second set of parameters of the radio configuration that are not valid after the topology change event; and update the second set of parameters based at least in part on the update information.

7. The UE of claim 6, wherein the one or more processors, to determine the update information, are configured to receive the update information.

8. The UE of claim 6, wherein the second set of parameters include one or more of a common timing advance parameter, a slot timing parameter that indicates a time gap between a last slot before the topology change event and a first slot after the topology change event, a serving cell measurement, a K_mac timing parameter, K_offset parameter, a synchronization signal block measurement timing configuration, a measurement gap configuration, or a conditional handover configuration.

9. The UE of claim 1, wherein the one or more processors, to receive the indication, are configured to receive the indication via a system information block (SIB).

10. The UE of claim 9, wherein the SIB is NTN-specific.

11. The UE of claim 9, wherein the indication includes one or more bits of an information element in the SIB.

12. The UE of claim 1, wherein the one or more processors, to receive the indication, are configured to receive the indication via downlink control information, a medium access control (MAC) control element, or a radio resource control message.

13. The UE of claim 1, wherein the one or more processors, to receive the indication, are configured to receive the indication via a short message over a physical downlink control channel in a paging occasion.

14. The UE of claim 1, wherein the indication indicates a first set of parameters that are to remain the same after the topology change event.

15. The UE of claim 1, wherein the indication indicates a second set of parameters that are to be updated after the topology change event.

16. The UE of claim 1, wherein the one or more processors are configured to skip a random access procedure after the topology change event.

17. A non-terrestrial network (NTN) entity for wireless communication, comprising:

one or more memories; and one or more processors, coupled to the one or more memories, configured to:

communicate with a user equipment (UE) using a radio configuration for a service link;

transmit, from the NTN entity and to the UE, an indication of a topology change event that is to occur, wherein the topology change event includes a change in an inter-satellite link (ISL), and that indicates that the service link is to be used before and after the topology change event, wherein the indication includes a timing of the topology change event; and communicate, after the topology change event, using at least part of the radio configuration for the service link.

18. The NTN entity of claim 17, wherein the at least part of the radio configuration includes a first set of parameters that are valid both before and after the topology change event.

19. The NTN entity of claim 18, wherein the first set of parameters include one or more of satellite ephemeris information, a closed-loop timing advance, frequency compensation of the service link, a hybrid automatic repeat request process configuration, a serving cell or beam antenna polarization, a last reported timing advance for the service link, or a last reported location of the UE.

20. The NTN entity of claim 19, wherein the one or more processors are configured to transmit update information for a second set of parameters of the radio configuration that are not valid after the topology change event.

21. The NTN entity of claim 20, wherein the second set of parameters include one or more of a common timing advance parameter, a slot timing parameter that indicates a time gap between a last slot before the topology change event and a first slot after the topology change event, a serving cell measurement, a K_mac timing parameter, a K_offset parameter, a synchronization signal block measurement timing configuration, a measurement gap configuration, or a conditional handover configuration.

22. The NTN entity of claim 17, wherein the one or more processors, to transmit the indication, are configured to transmit the indication via an NTN-specific system information block (SIB).

23. The NTN entity of claim 17, wherein the one or more processors, to transmit the indication, are configured to transmit the indication via downlink control information, a medium access control (MAC) control element, or a radio resource control message.

24. The NTN entity of claim 17, wherein the one or more processors, to transmit the indication, are configured to transmit the indication via a short message over a physical downlink control channel in a paging occasion.

25. The NTN entity of claim 17, wherein the indication indicates a first set of parameters that are to remain the same after the topology change event.

26. The NTN entity of claim 17, wherein the indication indicates a second set of parameters that are to be updated after the topology change event.

27. A method of wireless communication performed by a user equipment (UE), comprising:

communicating with a non-terrestrial network (NTN) entity using a radio configuration over a service link;

receiving, by the UE and from the NTN entity, an indication of a topology change event that is to occur, wherein the topology change event includes a change in an inter-satellite link (ISL), and the indication includes a timing of the topology change event; and communicating, after the topology change event, using at least part of the radio configuration over the service link.

28. A method of wireless communication performed by a non-terrestrial network (NTN) entity, comprising:

communicating with a user equipment (UE) using a radio configuration for a service link;

transmitting, from the NTN entity and to the UE, an indication of a topology change event that is to occur, wherein the topology change event includes a change in an inter-satellite link (ISL), and that indicates that the service link is to be used before and after the topology change event, wherein the indication includes a timing of the topology change event; and communicating, after the topology change event, using at least part of the radio configuration for the service link.

29. The method of claim 27, wherein the indication indicates that the service link is to be used before and after the topology change event.

30. The method of claim 28, wherein the at least part of the radio configuration includes a first set of parameters that are valid both before and after the topology change event.

* * * * *